Jan. 2, 1951      L. C. BOWLING      2,536,836
VALVE
Filed May 5, 1947
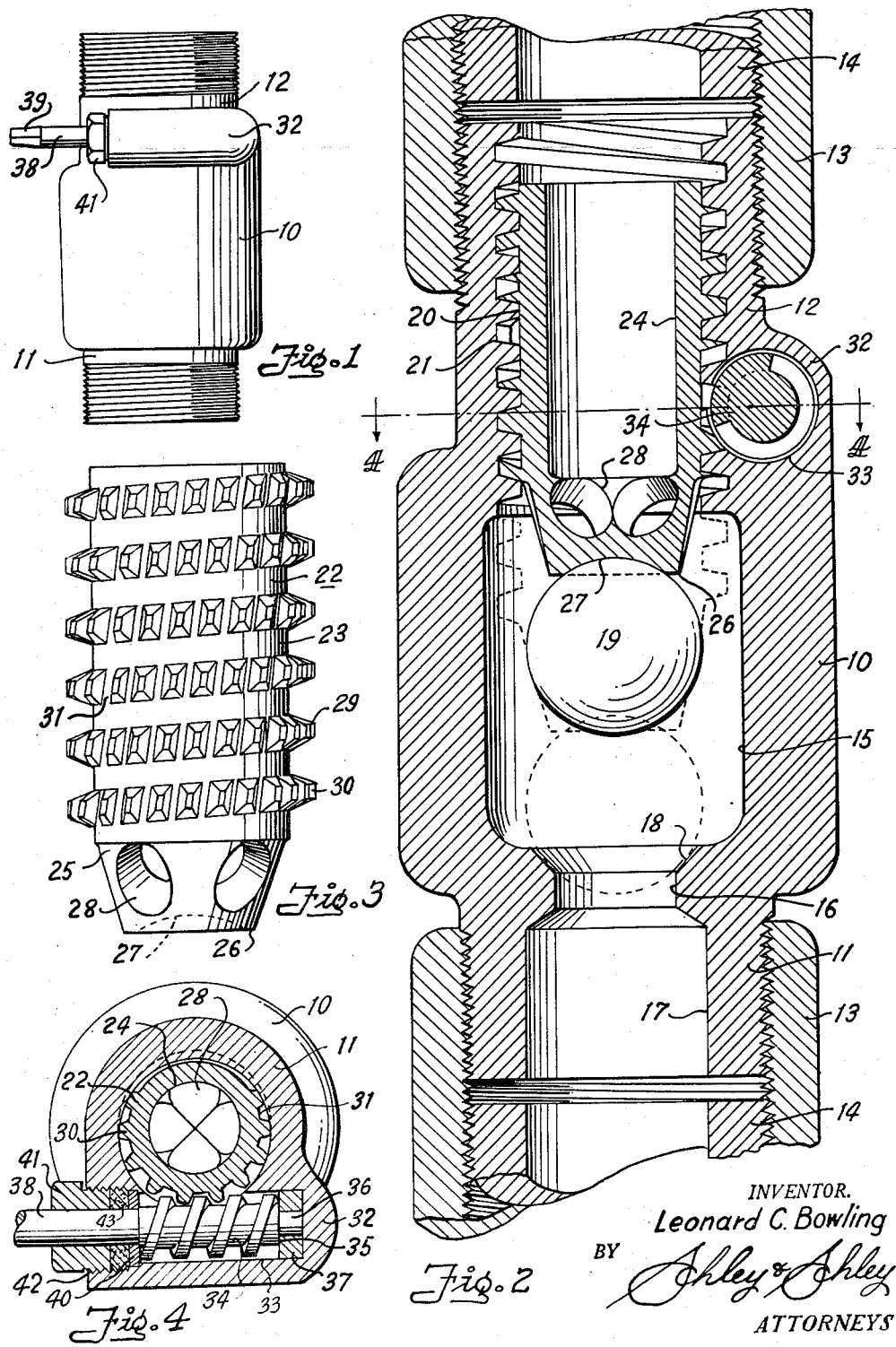
INVENTOR.
Leonard C. Bowling
BY Ashley & Ashley
ATTORNEYS Patented Jan. 2, 1951

2,536,836

UNITED STATES PATENT OFFICE 2,536,836

VALVE

Leonard C. Bowling, Houston, Tex.

Application May 5, 1947, Serial No. 745,906

5 Claims. (Cl. 251—139)

This invention relates to new and useful improvements in valves.

One object of this invention is to provide an improved valve having an axial flow passage so that the valve may be coupled to lengths of pipe or tubing without necessitating the use of elbows or bends, or otherwise necessitating the deviation of the course of the pipe from a substantially straight line.

Yet another object of the invention is to provide an improved valve which functions as a check valve, but may be positively closed when necessary or desirable.

Yet another object of the invention is to provide an improved valve having novel means for causing the valve core to move longitudinally of the valve housing for closing the valve; and wherein such novel means for moving the valve core permits the operation of a valve from one side so as to allow the connection of the valve into a straight length of pipe.

Still another object of the invention is to provide an improved valve having a core movable within the flow passage of the valve, the core being provided with a supplementary flow passage whereby axial flow of the fluid being handled is permitted to take place through the valve.

Another object of the invention is to provide an improved operating mechanism for valves which is simple and very compact, and whereby a considerably increased mechanical advantage is provided for opening or closing the valve so that a very tight seal of the valve may be obtained when so desired.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevation of a valve constructed in accordance with this invention, Fig. 2 is an enlarged, vertical, sectional view of the valve shown in Fig. 1 and having suitable pipe connected to each end thereof, Fig. 3 is a side elevation of the valve core, and Fig. 4 is a transverse, cross-sectional view taken on the line 4—4 of Fig. 2.

In the drawings, the numeral 10 designates a cylindrical valve housing or body having a reduced, externally screw-threaded pin 11 depending axially from the lower end thereof, and a similar, reduced, externally screw-threaded pin 12 projecting axially thereabove. Suitable pipe collars 13 may be connected to the pins 11 and 12 so as to join any desirable type of pipe 14 to the valve.

The housing 10 is formed with an internal, cylindrical chamber or flow passage 15 which communicates through a valve ring 16 with an axial bore 17 provided within the pin 11. The valve ring 16 has the usual bevelled valve seat 18 formed on that side of the ring which faces the chamber 15, the seat 18 being adapted to receive a valve element or member which may be of any suitable or desirable structure, but normally is in the form of a spherical ball 19. The valve ring 16 may be formed integrally with the body or housing 10, or may be in the form of a removable insert therein.

An axial bore 20 extends upwardly through the pin 12 and communicates between the chamber 15 and the upper extremity of said pin. Relatively large, Acme type threads 21 are cut in the wall of the bore 20 so that an internally screw-threaded passage through the pin 12 is presented or provided. Of course, the thread 21 may be of any suitable or desirable size and type, the reference to an Acme type thread being made merely for the purposes of illustration.

A particular type of valve core, designated generally by the numeral 22, is adapted to be disposed within the bore 20 and engage the screw-thread 21. The core 22 is in the form of an elongate cylindrical body 23 having an axial bore or flow passage 24 extending from its upper end to a point adjacent its lower end. The lower end of the body 23 has an inverted frusto-conical outline so as to provide the core with a downwardly and inwardly tapered pin 25 upon its lower extremity. The under or bottom face 26 of the pin is provided with a concave depression 27 in its central portion, the radius of curvature of the depression 27 being approximately of the same magnitude as the radius of curvature of the valve ball 19 so that upon downward movement of the core 22 the depression 27 tends to urge the valve ball 19 into the center portion of the chamber 15 by reason of engagement of said valve ball within said depression. A plurality of ports 28 extend radially inwardly and upwardly through the outer wall of the pin 25 into the lower end of the bore 24 so that communication may be had upwardly through said core.

An external screw-thread 29 is provided upon the outer surface of the body 23 of the core to allow the latter to engage within the bore 20.

The screw-thread 29 is relatively coarse or large and is, of course, complementary to the screw-thread 21 so as to have a snug engagement and fit therewith. The thread 29 is divided into a series of projections or gear teeth 30 by a plurality of grooves 31 which extend lengthwise of the core and at a slight angle with respect to the longitudinal axis thereof. Such a structure may be obtained by forming both the screw-thread 29 on the outer surface of the body 23 by the usual screw-thread machining operation, and by forming or cutting gear teeth or lands on the same outer surface of the body 23 in the thread 29 by means of the usual type of gear cutter (not shown), so that both the thread and the lands are formed in the same annular layer of material or metal constituting the outer portion of the body 23. The groove between successive convolutions of the thread and the grooves between the lands need not be of the same depth, nor is it essential that the projections 30 be in the form of gear teeth since they may be formed by simply grooving the thread 29 in a direction parallel or substantially parallel to the longitudinal axis of the body.

In the light of the foregoing, the body 23 may be viewed as being provided with an interrupted screw-thread or as being provided with a plurality of radially-extending external projections arranged in a helix upon its outer surface. Obviously, since the teeth 30 are to be engaged by a worm to be described hereinafter, it is desirable that they be in the form of gear teeth so as to eliminate looseness of fit and play between the core 22 and said worm. However, the projections may be of any suitable or desirable shape and size so long as they are capable of engaging within the screw-thread 21 so as to anchor the core within the bore 20, and at the same time may be engaged by a worm or other suitable device for rotating the core and causing it to move longitudinally of the bore 20 by reason of the screw-thread 21.

In practice, it has been found desirable to perform two machining operations upon the outer surface of the body 23 of the core, one being the forming of the helical worm or screw-thread 29, and the other being the cutting of gear teeth, either at an angle with respect to the axis of the body or parallel to the axis of the body, said gear teeth being cut in the superposed convolutions of the thread itself and normally not extending inwardly into the body 23 to a sufficient extent as to appear in the groove between said convolutions of the thread. However, either of the grooves may be of any desired depth, and the entire core unit may be formed by any suitable or desirable method such as casting or forging, or any other applicable process.

The core 22 is positioned within the bore 20 with the projections 30, which comprise the thread 29, engaged with the screw-thread 21 carried within the pin 12. Thus, upon rotation of the core in one direction, the latter will move downwardly within the bore 20 whereby the pin 25 engages the valve ball 19 and urges said ball into engagement with the valve seat 18; or, upon rotation in the other direction, the core moves upwardly so as to allow fluid under pressure entering through the bore 17 to force the valve ball from engagement with the seat, and thus permits the fluid to flow upwardly through the valve. By this action, the fluid is allowed to pass upwardly through the chamber 15 and through the ports 28 into the bore 24 of the core and thence upwardly through the bore 20 into the upper pipe 14. Oviously, since the ball 19 must be sufficiently small in diameter as to pass downwardly through the bore 20 to permit assembly of the valve, a flow passage upwardly through the chamber 15 and around the ball to the ports 28 is always present when the ball is unseated. Of course, if the seat ring 16 is constructed so as to be removable from the lower end of the valve, the valve ball may be inserted from the latter end of the body and would not necessarily be less in diameter than the bore 20.

In the event the fluid pressure being exerted through the bore 17 diminishes to a point at which it is not sufficient to displace the valve ball 19 from the seat 18, or if a tendency develops for the fluid to flow downwardly or in a reverse direction through the valve, the ball 19 will at once seat and prevent such reverse passage of fluid. Thus, the valve acts at all times as a check valve so that fluid flow in one direction only is permitted.

Any desirable means may be utilized for rotating the core 22. However, a worm has been found particularly suitable by reason of the considerable mechanical advantage derived thereby, such mechanical advantage causing the valve to operate very easily and smoothly as well as making provisions for insuring a very tight and snug seating of the valve ball 19 upon the seat 18 when it is desired to shut off all flow in either direction through the valve. For accommodating such a worm, the housing 10 is enlarged at one side near the junction of the cylindrical, central portion of the housing and the upper pin 12, such enlargement being designated generally by the numeral 32. The enlargement 32 extends transversely of the housing and at one side thereof so as to be approximately tangent to the bore 20 at a point near the lower end thereof. A cylindrical bore 33 extends from one end of the enlargement 32 to a point adjacent the opposite end of the enlarged portion, this bore forming in effect a deep, circular recess, cylindrical in outline, and lying contiguous and substantially tangential to the bore 20, with the axis of the bore 33 being disposed at right angles to the axis of the bore 20, as is clearly shown in Figs. 2 and 4 of the drawings. A portion of the bore 33 intersects the bore 20 and the thread 21 so that a number of the projections 30 carried by the core 22 project into the bore 33. For engaging said projections, a suitable worm 34 of usual and ordinary construction, is disposed within the bore 33 and extends substantially throughout the length thereof. The worm 34 carries the usual external thread or worm in the form of a radially-projecting rib or ridge 35 having a helical shape and extending throughout the length of said worm. A reduced pin 36 extends axially of the inner end of the worm 34 and engages within a suitable bearing 37 having a press fit in the bottom or inner extremity of the bore 33, the engagement of the pin 36 in said bearing serving to support the inner portion of the worm and allow the same to rotate freely. The outer end of the worm carries a reduced, elongate, axial shaft or stem 38 which projects outwardly through and beyond the open end of the bore 33 so as to extend a short distance laterally of the valve housing 10. A suitable wrench fitting 39 is formed on the extreme outer end of the stem 38 to permit engagement of the same with a suitable wheel (not shown) or wrench (not shown) for rotating said stem and thereby the worm 34.

A flat circular washer 40 has a snug sliding fit on the stem 38 and is adapted to abut the outer end of the worm 34 as shown in Fig. 4. A suitable packing gland nut 41 also has a sliding fit on the stem 38 and engages within internal screw-threads 42 carried within the outer end of the bore 33. Any desirable type of packing material 43 is confined between the inner end of the nut 41 and the outer surface of the washer 40. The packing gland so constituted serves both as a bearing for the outer end of the worm 34 and to prevent the escape of fluid under pressure through the open end of the bore 33.

The worm 34 is of such style and dimensions as to have engagement with those projections 30 which extend within the bore 33 whereby rotation of the worm causes successive projections to be engaged and moved in a circumferential direction within the bore 20. In other words, the worm 34 has rotative engagement with the projections or gear teeth 30 whereby rotation of the worm about its rotative axis causes the projections 30 to be fed into and forced from that portion of the bore 20 which lies within the outlines of the bore 33 whereby the core 22 is rotated and caused to move upwardly or downwardly by reason of the screw-threads 21 and 29. Obviously, the mechanical advantage obtained depends upon the pitch of the worm 34 and the pitch of the thread 29 carried upon the core 22, but so long as the latter are within practicable limits the mechanical advantage achieved is very considerable.

While many other mechanical movements for rotating the core 22 may present themselves, the present arrangement has proven extremely satisfactory both as to certainty and security of operation as well as in regard to the economic aspects involved in the production of this valve on a commercial basis.

The applications of the valve are manifold. Obviously, it may be utilized in any instance in which a valve is desired, and it also lends itself readily to many specialized installations, as for instance where it is desired to have a valve which may function as a check valve in one direction and as an ordinary valve in an opposite direction. The present invention provides such a valve with a minimum of expense and a complexity of structure, and at the same time provides a very satisfactory and trustworthy device. It is also pointed out that the inlet and outlet of the valve are in axial and parallel alinement whereby the valve may be inserted into a straight length of pipe without necessitating the use of bends or elbows or misalinement of the sections of pipe being joined by means of the valve. Because of the symmetrical structure of the interior portion of the valve, the latter may be positioned so as to have the stem 38 projecting in any desired direction so that all the flexibility of positioning of an ordinary globe type valve is obtained.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve including, a valve housing having a flow passage, an internal screw-thread in at least a portion of the passage, a valve core having a plurality of external projections arranged in a helix engaging the internal screw-thread, a valve seat in the housing, and means engaging said projections for rotating the core and causing the latter to move longitudinally in the flow passage to and from the seat.

2. A valve including, a valve housing having an axial flow passage, a valve seat in the housing, a valve ball in the flow passage adapted to engage the seat, an internal screw-thread in the flow passage, a valve core having an external screw-thread adapted to engage the internal screw-thread whereby rotation of the core causes the latter to move axially of the flow passage to engage the valve ball and urge the latter into engagement with the valve seat, said core having an axial bore communicating through radial openings with the flow passage at the valve ball engaging end of the core and communicating with the flow passage at the opposite end of the core, longitudinal gear teeth cut in the external screw-thread of the core, a worm rotatably mounted in the housing and adapted to engage the gear teeth to rotate the valve core, and means projecting laterally of the housing for rotating the worm.

3. A valve including, a valve housing having a flow passage, an internal screwthread in at least a portion of the passage, a valve core having a plurality of external projections arranged in a helix engaging the internal screwthread, a valve seat in the housing, a check valve between the core and the seat adapted to engage said seat, and means engaging said projections for rotating the core and causing the latter to move longitudinally in the flow passage to move the check valve into engagement with the seat.

4. A valve including, a valve body having an axial flow passage, a valve seat in the flow passage, a check valve in the flow passage adapted to engage the seat, an internal screwthread in the flow passage, a valve core having an external screwthread adapted to engage the internal screwthread whereby rotation of the core causes the latter to move axially of the flow passage to engage the check valve and urge the latter into engagement with the valve seat, said core having an axial bore communicating through radial openings with the flow passage at the check valve engaging end of the core and communicating with the flow passage at the opposite end of the core, longitudinal gear teeth cut in the external screwthread of the core, a worm rotatably mounted in the valve body and adapted to engage the gear teeth to rotate the valve core, and means projecting laterally of the valve body for rotating the worm.

5. A valve including, a valve body having an axial flow passage, a valve seat in the flow passage, a check valve in the flow passage adapted to engage the seat, an internal screwthread in the flow passage, a valve core having an external screwthread adapted to engage the internal screwthread whereby rotation of the core causes the latter to move axially of the flow passage to engage the check valve and urge the latter into engagement with the valve seat, said core having an axial bore communicating with the flow passage at the check valve engaging end of the core and communicating with the flow pasage at the opposite end of the core, longitudinal gear teeth cut in the external screwthread of the core, a worm rotatably mounted in the valve body and adapted to engage the gear teeth to rotate the valve core, and means projecting laterally of the valve body for rotating the worm.

LEONARD C. BOWLING.

REFERENCES CITED

The following references are of record in the file of this patent:

UNITED STATES PATENTS

| Number | Name | Date |
|---|---|---|
| 32,201 | Neumann | Apr. 30, 1861 |
| 857,634 | Kriner | June 25, 1907 |
| 1,254,716 | Madeksho | Jan. 29, 1918 |
| 1,275,783 | Steinmetz | Aug. 13, 1918 |
| 1,508,944 | Simon | Sept. 16, 1924 |
| 2,133,983 | Gaston | Oct. 25, 1938 |
| 2,372,261 | Drda | Mar. 27, 1945 |

FOREIGN PATENTS

| Number | Country | Date |
|---|---|---|
| 26,434 | Great Britain | of 1913 |
| 116,934 | Austria | of 1930 |
| 265,486 | Italy | of 1929 |
| 864,992 | France | of 1941 |